Oct. 28, 1930.  G. O. HARM  1,779,734
DUSTLESS BATCHER
Filed June 20, 1928   3 Sheets-Sheet 3

Inventor:
George O. Harm
By Monroe E. Miller
Attorney.

Patented Oct. 28, 1930

1,779,734

UNITED STATES PATENT OFFICE

GEORGE O. HARM, OF WARREN, OHIO

DUSTLESS BATCHER

Application filed June 20, 1928. Serial No. 287,028.

The present invention relates to batchers, such as are employed for discharging or delivering batches of cement or other fine material, and aims to provide a dustless batcher which will eliminate the discharge of dust into the air during the operation of the batcher.

In the use of cement and similar batchers, when the cement or other powdered material drops from the bin into the weighing or measuring chamber, the displaced air in such chamber forces streams of dust from the chamber out of every opening that exists. This dust discharges into the air and settles on the surrounding property, and is even blown by the wind to adjoining properties so as to constitute a nuisance. Attempts have been made to prevent the discharge of dust by draping bags or canvas over the openings, but this method has been unsatisfactory, and such plan is not only an inconvenience, but also results in loss of material.

In order to eliminate the discharge of dust into the air or to the surrounding property, it is the object of the invention to provide the batcher with a vent through which the air and dust may pass, without leaving the batcher, and the weighing or measuring chamber may be made air-tight otherwise.

Another object of the invention is to accomplish the aforesaid results in a simple, inexpensive, practical and efficient manner.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
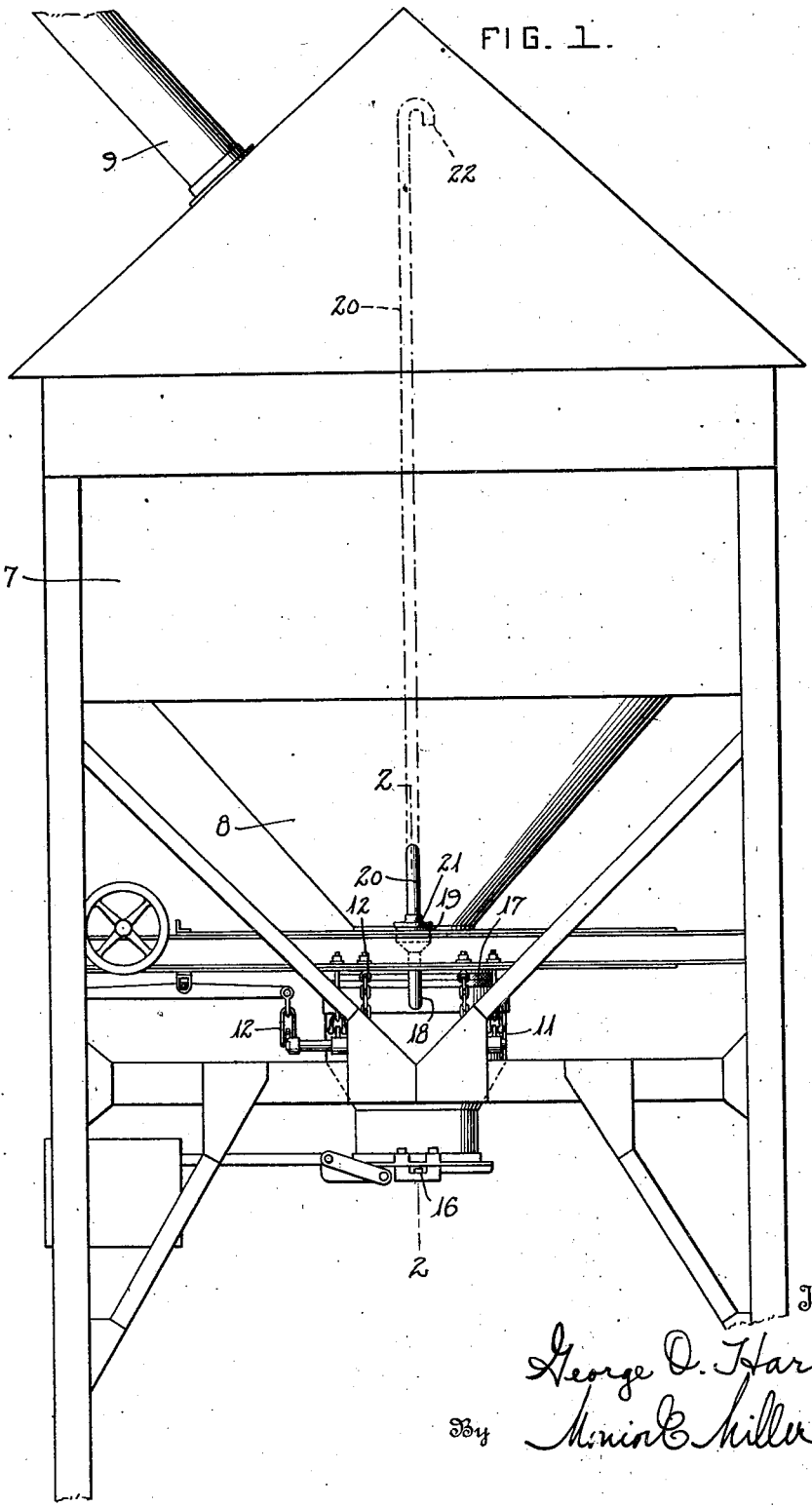
Fig. 1 is a side elevation of a weighing batcher embodying the improvement.
Figure 2:
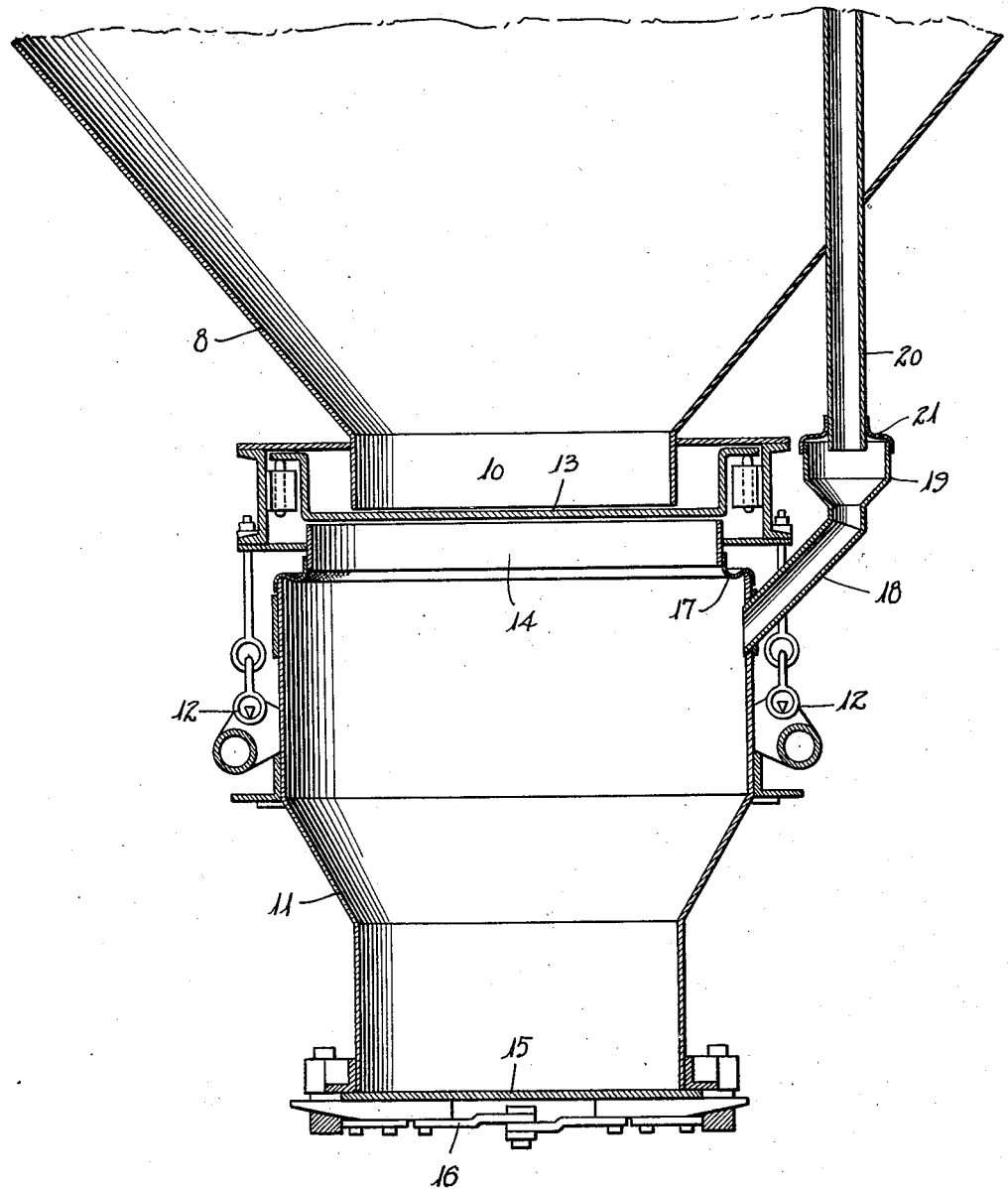
Fig. 2 is an enlarged vertical section on the line 2—2 of Fig. 1.

The improvements may be embodied in either weight or volume batchers of various types. As shown, the improvements are embodied in a weighing batcher which comprises the bin 7 having the hopper bottom 8, the cement or other material being delivered into the bin through the chute 9 from an elevator (not shown).

A weighing chamber 11 is suspended by the weighing mechanism 12 under the spout 10 of the hopper 8, and a slide valve or gate 13 moves snugly under the spout 10 to control the flow of material from the hopper into the chamber 11. A neck 14 is disposed snugly under the gate 13 at the upper end of the chamber, and the chamber has a lower discharge gate 15 with suitable latching means 16.

The batcher as described up to this point is of well known construction, for delivering batches of cement or similar material of predetermined weight, the gate 13, after being opened, being controlled by the weighing mechanism in order that said gate will be closed when the material flowing from the hopper into the chamber reaches a predetermined weight in said chamber. The gate 15 is then opened to deliver the batch of material from the chamber 11 to a wagon, truck, or other suitable receiver.

In carrying out the invention, a bellows or diaphragm 17 of cloth, leather, or other suitable flexible material, is secured to the adjacent edges of the chamber 11 and neck 14, thereby closing the space between the upper end of said chamber and said neck, so that the air and dust cannot blow between them.

A vent pipe 18 is connected to the chamber 11 at one side near the upper end therof, and has a funnel or enlargement 19 receiving the lower end of a vertical vent pipe 20 that extends upwardly through the hopper 8 into the upper portion of the bin 7. A bellows or diaphragm 21 is secured to the lower terminal of the pipe 20 and the rim of the funnel or enlargement 19, to close the space between them, and the upper end of the pipe 20 is directed downwardly, as at 22, to discharge the dust from the pipe downwardly into the bin.

The bellows or diaphragms 17 and 21 not only close the corresponding spaces, but also permit the chamber 11 to move vertically without interference.

The chamber 11 is air-tight between the upper and lower gates, excepting for the vent pipe 20, so that no dust is discharged from the chamber during the flow of cement or other material from the bin into the chamber when the gate 13 is opened.

The displaced air flows up through the pipes 18, 20 and the dust is delivered downwardly into the bin under the roof thereof, so that the dust may settle down in the bin. The dust is confined within the bin and cannot escape therefrom. Moreover, the material flowing from the bin into the chamber 11 will create an enlargement of the air space within the bin, so that there is a tendency to create a sub-atmospheric pressure within the upper portion of the bin so that this air suction assists in drawing the air and dust from the chamber 11 through the pipes 18, 20 into the bin. The pipes 18, 20 thus equalizes the air pressures in the bin and chamber.

When the gate 13 is closed and the gate 15 opened, the material drops from the chamber, and this creates an air suction or sub-atmospheric pressure within the chamber, but the air flowing from the bin through the pipes 18, 20 into the chamber 11 will relieve the suction, so that the material may drop from the chamber with less agitation than if the entrance of air into the chamber is restricted.

Figure 3:
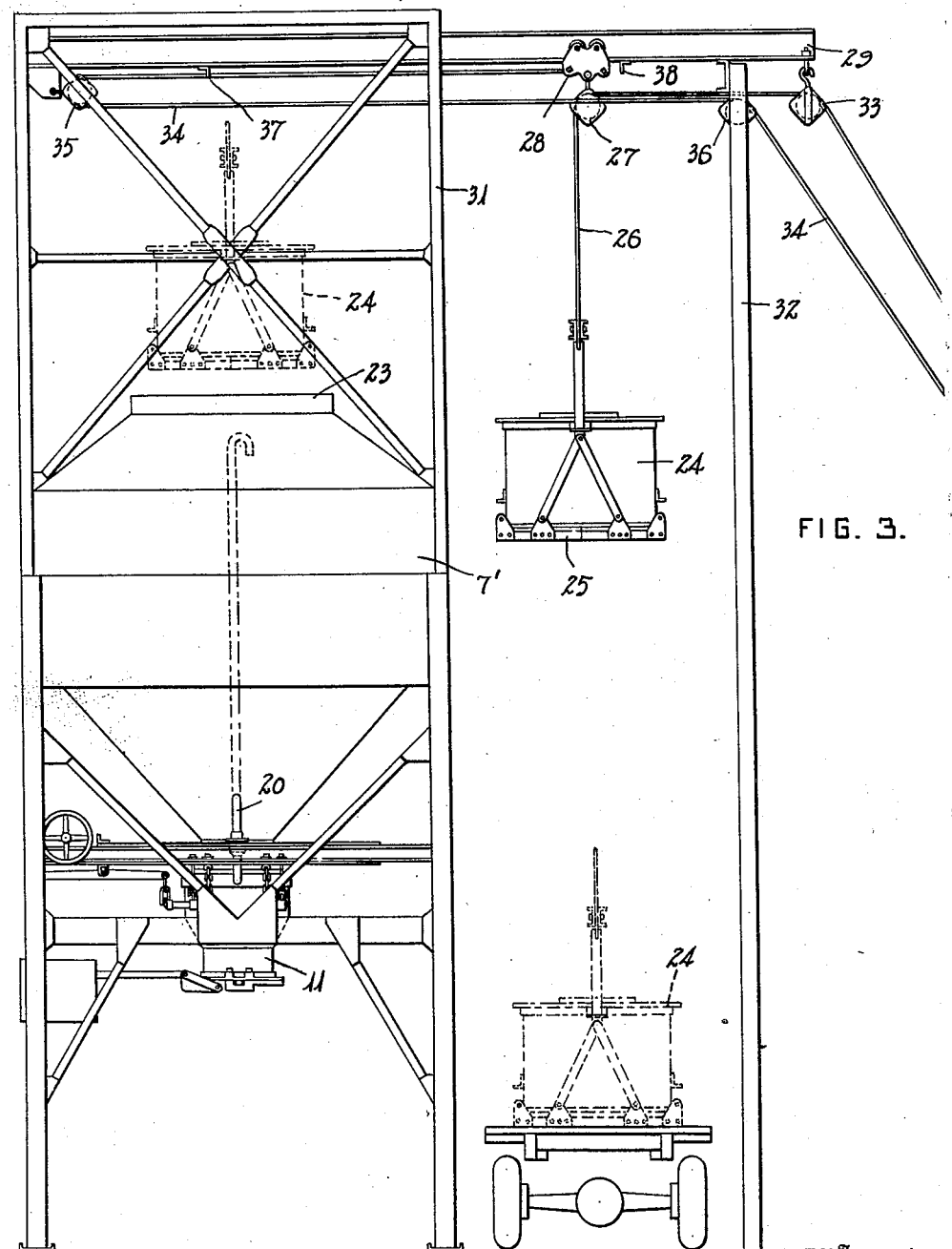
Fig. 3 is a side elevation of a different type of batcher plant embodying the invention.

The bin 7′ shown in Fig. 3 has the filling opening 23 in the top thereof, which may be normally closed by a suitable door or cover, down which a bucket 24 may be lowered, to dump the cement or other material into the bin. The bucket 24 may be used for transporting the cement from the cement mill in large quantities, instead of handling the cement in bags as usual, and the bucket 24 has a drop bottom 25 that may be opened for dumping the cement into the bin.

The bucket 24 is lifted from a truck by a cable 26 which pases over a pulley block 27 suspended from a trolley 28 that moves on a rail 29 secured to the upper end of the frame 31 which carries the bin 7′, and the outwardly projecting portion of the rail is supported by a column 32 disposed at one side of the frame 7′ so that the truck carrying the bucket may move between said column and frame. The cable 26 passes over a pulley block 33 suspended from the outer end of the rail 29, and a second cable 34 passes over pulley blocks 35 and 36 at the inner and outer ends of the rail 29 and is connected to the trolley 28.

When the cable 26 is connected to the bucket 24 carried by the truck, the cable 26 is pulled to raise the bucket, and the cable 34 is then pulled so as to move the bucket inwardly with the trolley 28 to a position above the bin. The cable 26 is then slackened to lower the bucket into the bin, and the bottom 25 of the bucket is then opened to discharge the material into the bin. The cable 26 is then pulled to again raise the bucket and cable 34 is then pulled in the reverse direction to pull the bucket and trolley outwardly, after which the cable 26 is slackened to lower the bucket back to the truck. The rail 29 has stops 37 and 38 to limit the inward and outward movements of the trolley 28.

In this construction, the pipe 20 is offset to one side so as not to interfere with the movement of the bucket 24 into the bin.

Having thus described the invention, what is claimed as new is:—

1. A batcher comprising a bin, a vertically movable chamber below the bin to receive material therefrom, a gate movable under the bin, a neck under said gate, a bellows connecting said neck and upper portion of said chamber, and a vent for said chamber extending into the bin.

2. A batcher comprising a bin, a vertically movable chamber below the bin to receive material therefrom, and a vent comprising relatively movable pipes, one connected to said chamber and the other extending into the bin.

3. A batcher comprising a bin, a vertically movable chamber below the bin to receive material therefrom, a vent pipe connected to said chamber, a vent pipe extending into the bin, and a bellows connection between said pipes.

4. A batcher comprising a bin for powdered material and having a discharge outlet at the bottom thereof, a chamber below said outlet to receive the powered material from the bin, a cut-off gate movable under said outlet, and a vent for said chamber extending into the bin for the flow of air and dust from the chamber into the bin.

5. A batcher comprising a bin for powdered material and having a discharge outlet at the bottom thereof, a chamber below said outlet to receive the powdered material from the bin, a cut-off gate movable under said outlet, and a vent conduit connected to the upper portion of said chamber and extending upwardly into the bin to the upper portion thereof for the flow of air and dust from said chamber into the bin.

6. A batcher comprising a bin for powdered material and having a lower discharge outlet, a neck below said outlet, a shut-off gate movable between said outlet and neck, a vertically movable chamber below said neck and having a lower discharge gate, and a bellows connecting said neck and chamber.

In testimony whereof I hereunto affix my signature.

GEORGE O. HARM.